Sept. 26, 1933.  A. HALLER  1,928,176
SPRING FOR VEHICLES
Filed Sept. 21, 1931
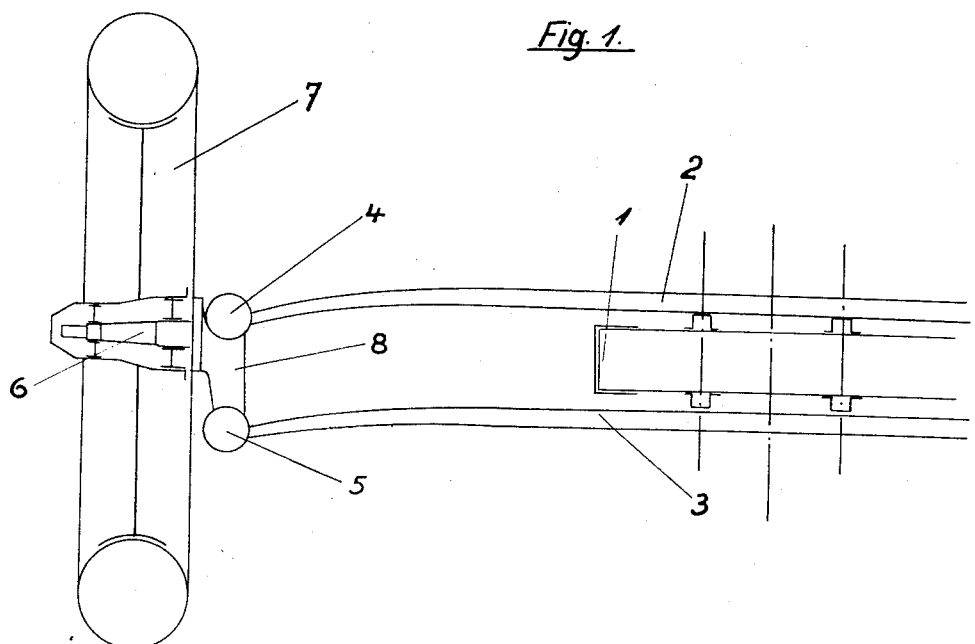
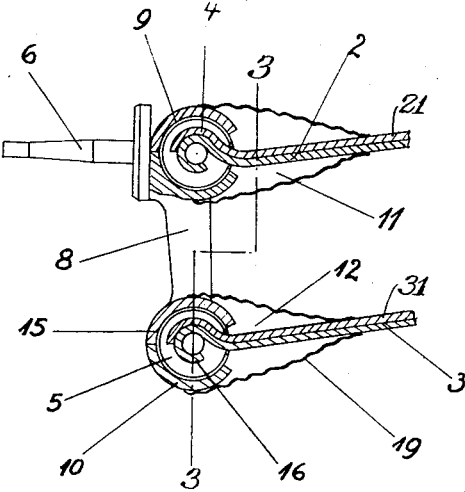
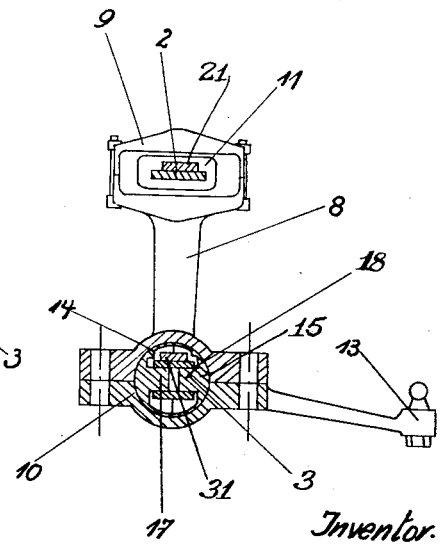
Inventor.
Andreas Haller Patented Sept. 26, 1933

1,928,176

UNITED STATES PATENT OFFICE 1,928,176

SPRING FOR VEHICLES

Andreas Haller, Stuttgart, Germany, assignor to Daimler - Benz Aktiengesellschaft, Stuttgart-Unterturkheim, Germany, a company of Germany Application September 21, 1931, Serial No. 564,214, and in Germany November 6, 1930.

5 Claims. (Cl. 280—96.1)

This invention relates to an improvement in automotive vehicles and generally to an especially suitable connection of the leaf springs with a flexible element joined to the latter. It is also particularly applicable to the connection of an axle which is formed by a pair of leaf springs with the steering swivels supporting the stubs of the steering wheels.

An object of the invention is to provide a front axle of great simplicity and safety, the pivot joint being protected against damage and dirt and which can easily be lubricated. Another object of the invention is to provide an improved connection of the spring ends with the steering swivels, whereby the spring leaves are not weakened by having holes bored through them or their physical properties such as strength and elasticity detrimentally affected by unsuitable metal working operations such as upsetting, welding etc.

A further object of the invention is to provide the connection of the spring ends with the swivels in such a way that in the event of the main leaf spring breaking, the connection between the spring and the swivel will not be interrupted, the spring being supported on the swivel by means of a second leaf, the end of which partly surround the ends of the main spring.

Furthermore the invention provides an especially favourable and simple arrangement for mounting axles with wheels independently movable from the other.

In the drawing which gives by way of example a constructional form of the invention Fig. 1 is an elevation of a front axle formed by two supporting springs arranged one above the other.

Fig. 2 gives on an enlarged scale a section parallel to the plane of Fig. 1.

Fig. 3 is a section on line 3—3 of Fig. 2 taken from the right.

1 is the chassis frame to which the two pairs of transverse leaf springs 2, 21 and 3, 31 are attached in a known manner. The ends of the springs are connected with the steering swivel carrier 8 by the ball joints 4 and 5, the stub axle 6 supporting the wheel 7. The ends of the springs are housed in cavities 9 and 10 in the carrier 8 in such a way that only the openings 11 and 12 are left open for the passage of the swinging springs. The lower end of the carrier 8, in which the cavity 10 is provided, is for instance connected with the steering arm forming at its outer end by a ball joint 13. In the ball-shaped cavities 9 and 10 are mounted hollow ball-shaped pivot carriers, each of which comprises two parts 14 and 15 (Fig. 3), each part having a cylindrical projection 17, 18, respectively in its interior which is inserted into an eye 16 formed by bending over the end of the lower leaf spring of each pair, the said cylindrical projections forming the pivots for the spring ends. In Fig. 3 only the pivot carrier for one end of the spring 3 is shown and it is to be understood that the pivot carrier for the other end of the spring and the pivot carriers for the spring 2 are of identical construction. The openings 11 and 12 may be covered by leather gaiters 19 for preventing the entry of dirt into the cavities 9 and 10 and ensuring proper lubrication of the joints.

The upper leaves 21 and 31 also extend into the cavities 9, 10 and the ends thereof partly surround the pivot eyes, serving as an auxiliary support in the event of breakage of the lower main leaves 2 and 3.

The pivot carriers 14, 15 are capable of turning in the cavities 9, 10 about a vertical axis and also relatively to the spring ends about a horizontal axis, thereby allowing the spring to deflect under load and permitting the steering swivel carrier 8 to swivel about a line joining the centres of the cavities 9, 10, the stub axle being rigid with the carrier 8.

The illustration is given only by way of example and the invention is not limited to the exact construction shown, two pieces or a one piece bush could for instance be provided and the joining of the spring end with the bush may be effected by a bolt or in any other suitable way. The invention may also be applied to any other sort of axles the steering swivels of which or other parts are flexibly connected to the leaf spring ends.

What I claim is:

1. A spring axle structure for vehicles, comprising in combination a pair of superposed transverse supporting springs, each of said springs comprising a main spring leaf having an end thereof bent over to form a pivot eye and a second spring leaf having its end partly encircling said pivot eye, a steering swivel carrier, a pair of hollow pivot carriers mounted on said steering swivel carrier, each of said hollow pivot carriers having an opening adapted to allow the entry into the interior of the carrier of the bent over end of one of said main spring leaves and the end of the second spring leaf associated with said main spring leaf, and pivot members in the interior of the pivot carriers inserted in the pivot eyes of the main spring leaves, said openings in the pivot carriers being only large enough to allow the supporting springs to enter the interiors of the pivot carriers, so as to ensure the retention of the spring ends in the pivot carriers even in the event of fracture of the main spring leaf.

2. In a spring axle structure for vehicles, a leaf spring comprising a main spring leaf having an end thereof bent over to form a pivot eye and a second spring leaf having its end partly encircling said pivot eye, a steering swivel carrier, a hollow pivot carrier mounted on said steering swivel carrier, said hollow pivot carrier having an opening adapted to allow the entry into the interior of the carrier of the bent over end of said main spring leaf and the end of the second spring leaf associated with said main spring leaf, and a pivot member in the interior of the pivot carrier inserted in the pivot eye of the main spring leaf, said opening in the pivot carrier being only large enough to allow the supporting spring to enter the interior of the pivot carrier, so as to ensure the retention of the spring end in the pivot carrier even in the event of fracture of the main spring leaf.

3. In a spring axle structure for vehicles, a leaf spring having an end thereof bent over to form a pivot eye, a steering swivel carrier having a substantially spherical cavity therein, a hollow, substantially spherical pivot carrier journalled in said cavity so as to be capable of turning in any direction, said hollow pivot carrier having a lateral opening therein adapted to allow the entry into the interior of the pivot carrier of the bent over end of said leaf spring and a pivot member in the interior of the pivot carrier inserted in the pivot eye of the leaf spring.

4. In a spring axle structure for vehicles, a leaf spring comprising a main spring leaf having an end thereof bent over to form a pivot eye and a second spring leaf having its end partly encircling said pivot eye, a steering swivel carrier, a hollow pivot carrier mounted on said steering swivel carrier, having a substantially spherical cavity therein, a hollow, substantially spherical pivot carrier journalled in said cavity so as to be capable of turning in any direction, said hollow pivot carrier having an opening adapted to allow the entry into the interior of the carrier of the bent over end of said main spring leaf and the end of the second spring leaf associated with said main spring leaf, and a pivot member in the interior of the pivot carrier inserted in the pivot eye of the main spring leaf, said opening in the pivot carrier being only large enough to allow the supporting spring to enter the interior of the pivot carrier, so as to ensure the retention of the spring end in the pivot carrier even in the event of fracture of the main spring leaf.

5. A spring axle structure for vehicles, comprising in combination a pair of superposed transverse supporting springs each of said springs having an end thereof bent over to form a pivot eye, a steering swivel carrier having two superposed substantially spherical cavities therein, hollow, substantially spherical pivot carriers journalled in said cavities so as to be capable of turning in any direction, said hollow pivot carriers having lateral openings therein adapted to allow the entry into the interior of each pivot carrier of the bent over end of one of said leaf springs and pivot members in the interiors of the pivot carriers inserted in the pivot eyes of the leaf springs.

ANDREAS HALLER.